(12) United States Patent
Stockinger et al.

(10) Patent No.: US 6,264,725 B1
(45) Date of Patent: *Jul. 24, 2001

(54) METHOD FOR PRODUCING LIQUID PIG IRON OR STEEL FABRICATED MATERIALS AND INSTALLATION FOR IMPLEMENTING SAID METHOD

(75) Inventors: Josef Stockinger, Leonding; Michael Nagl, Reichenau, both of (AT)

(73) Assignee: Voest-Alpine Industrieanlagenbau GmbH, Linz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 09/284,104
(22) PCT Filed: Oct. 6, 1997
(86) PCT No.: PCT/AT97/00214
 § 371 Date: Apr. 7, 1999
 § 102(e) Date: Apr. 7, 1999
(87) PCT Pub. No.: WO98/15661
 PCT Pub. Date: Apr. 16, 1998

(30) Foreign Application Priority Data

Oct. 8, 1996 (AT) .................................................. 1779/96

(51) Int. Cl.⁷ ............................... C21B 13/06; C22B 7/02
(52) U.S. Cl. ............................. 75/504; 75/550; 75/446; 75/491; 75/961
(58) Field of Search ............................. 75/504, 550, 446, 75/491, 961

(56) References Cited

U.S. PATENT DOCUMENTS 4,490,170  12/1984  Lilja et al. ................................. 75/26

5,989,309 * 11/1999  Joo et al. ................................. 75/453

FOREIGN PATENT DOCUMENTS

| 1086256 | 8/1960 | (DE) . |
| 827957 | 2/1960 | (GB) . |
| 90/07010 | 6/1990 | (WO) . |
| 90/15162 | 12/1990 | (WO) . |

\* cited by examiner

*Primary Examiner*—Roy King
*Assistant Examiner*—Tima McGuthry-Banks
(74) *Attorney, Agent, or Firm*—Ostrolenk, Faber, Gerb & Soffen, LLP

(57) ABSTRACT

According to a process for producing pig iron (10) from fine-particulate iron oxide carriers and lumpy iron-containing material in a meltdown gasifying zone (9) of a melter gasifier (3), the iron-containing material is melted in a bed (13) formed of solid carbon carriers, under the supply of carbon-containing material and oxygen-containing gas while simultaneously forming a reducing gas. Fine-particulate iron-oxide carriers, such as iron-containing fine ore and ore dust and oxidic iron fine dust, are introduced into a reducing gas stream leaving the melter gasifier (3), and the reducing gas is separated from the fine-particulate material formed thereby. The separated fine-particulate material is introduced into the meltdown gasifying zone (9) via a dust recirculation line (26, 27, 28, 29) and through a dust burner (30), and the reducing gas is used for reducing iron-oxide-containing material. To be able to charge large amounts of fine ore or ore dust in this process, the separated fine-particulate material in the dust recirculation line (26 to 29) is conveyed via a fluidized bed sluice (25) formed by the separated fine-particulate material and by reducing gas to the dust burner (30) and reduced thereby (FIG. 1).

18 Claims, 3 Drawing Sheets

METHOD FOR PRODUCING LIQUID PIG IRON OR STEEL FABRICATED MATERIALS AND INSTALLATION FOR IMPLEMENTING SAID METHOD

This is a national stage of Application No. PCT/AT97/00214, filed Oct. 6, 1997, which claims priority to Austrian Patent Application No. A1779/96 filed on Oct. 8, 1996.

BACKGROUND OF THE INVENTION

1. Field of the Invention

The invention relates to a process for producing liquid pig iron or steel preproducts from fine-particulate iron oxide carriers and lumpy iron-containing material, such as partially and/or completely reduced sponge iron, in a meltdown gasifying zone of a melter gasifier, in which the iron-containing material, optionally upon previous complete reduction, is melted in a bed formed of solid carbon carriers, under the supply of carbon-containing material and oxygen-containing gas while simultaneously forming a reducing gas, wherein fine-particulate iron oxide carriers, such as iron-containing fine ore and ore dust and oxidic iron fine dust, are introduced into a reducing gas stream leaving the melter gasifier, the reducing gas is freed from the fine-particulate material formed therefrom, the separated fine-particulate material is introduced into the meltdown gasifying zone by means of a dust burner via a dust recirculation line and the reducing gas is used for reducing the iron-oxide-containing material, and a plant for carrying out the process.

2. Brief Description of the Related Art

A process of this type of known from EP-A-0 576 414. The known process allows to charge larger amounts of fine ore and/or ore dust, such as oxidic iron fine dust accumulating in a metallurgical plant, in addition to lump ore. The oxidic fine particles introduced into the reducing gas stream are conveyed into the meltdown gasifying zone of the melter gasifier via a dust recirculation line. The dust recirculation line is comprised of a dust sluice and a pneumatic conveying system as well as of a dust burner, the dust sluice overcoming the pressure difference between the melter gasifier and the solids separator, for example a cyclone, which, in turn, frees the reducing gas from the fine particles.

However, a problem arises from the fact that the oxidic fine particles introduced into the meltdown gasifying zones have to be reduced yet. In order not to impair the meltdown and gasifying process in the meltdown gasifying zone, i.e. the generation of reducing gas, the amount of such oxidic fine particles that can be processed according to the known process is not very large.

SUMMARY OF THE INVENTION

The object of the invention is to prevent these disadvantages and difficulties and to solve the technical problem of further developing the process described above to the effect that large amounts of fine ore and/or ore dust, such as oxidic iron fine dust accumulating in a metallurgical plant, can be charged without disturbing the meltdown gasifying process and without involving a large number of apparatus.

According to the invention, this problem is solved by conveying the separated fine-particulate material in the dust recirculation line via a fluidized bed sluice formed by the separated fine-particulate material and by reducing gas to the dust burner and reducing it thereby.

In this way, the fine-particulate iron oxide carriers introduced into the reducing gas stream, such as fine ore, are prereduced to a high degree during transport via the dust recirculation line, the required plant components being easy to implement in respect of design and cost. The high degree of prereduction of the fine-particulate iron oxide carriers allows to process very large amounts of such iron oxide carriers without impairing the meltdown and gasifying process in any way.

A variant which optimally uses the reducing gas supplied to the dust recirculation line is characterized in that the fluidized bed sluice comprises a counterflow fluidized bed zone formed by the separated fine-particulate material and penetrated by reducing gas in counterflow to said material, and a parallel-flow fluidized bed zone formed by the separated fine-particulate material and penetrated by reducing gas in parallel flow with said material, preferably in a substantially larger amount than in the counterflow fluidized bed zone, in which zones the fine-particulate material is reduced.

To ensure a certain extent of reduction of the fine-particulate iron oxide carriers already in the reducing gas stream, the fine-particulate iron ore is advantageously introduced into the reducing gas stream, shortly after the latter has left the melter gasifier, the fine-particulate iron ore being expediently blown into the reducing gas stream, preferably after the latter has been cooled to 800 to 900° C.

The ensure an optimum contact of the individual fine particles with the reducing gas, immediately after entry of the fine particles into the reducing gas stream, a central material jet formed by the fine-particulate iron ore and a carrier gas, is introduced into the reducing gas according to a preferred embodiment and at least one gas jet formed by a secondary gas is directed against the material jet, the gas jet atomizing the material jet and the fine particles being uniformly distributed within the reducing gas.

The gas jet preferably imparts to the material jet a torque about the axis of the material jet and the fine particles leave the material jet due to centrifugal forces, thereby disintegrating the same.

A good contact of the fine particles with the reducing gas can also be ensured by blowing the fine-particulate iron ore into the reducing gas stream in a direction opposite to the flow of the latter.

A plant for carrying out the process by means of a melter gasifier with a supply duct for feeding carbon-containing material, a reducing gas duct including a solids separator for drawing off the reducing gas generated and a duct for feeding oxygen-containing gas, as well as with a slag and iron melt tap, wherein a lower section of the melter gasifier for collecting the molten pig iron or steel prematerial and the liquid slag, a central section located thereabove for accommodating a bed of solid carbon carriers and, following thereupon, an upper section as a killing space are provided, and a reduction vessel for iron-oxide-containing material, wherein the reduction vessel is connected with the melter gasifier via the reducing gas duct and a duct conveying the at least partially reduced material (sponge iron) from the reduction vessel to the melter gasifier and a conveying duct for fine-particulate iron ore runs into the reducing gas duct, and comprising a dust recirculation means departing from the solids separator and opening into the melter gasifier by means of a dust burner, characterized in that the dust recirculation means is comprised of at least one fluidized bed reactor into which a duct feeding reducing gas runs.

According to a preferred embodiment, the dust recirculation means is comprised of a counterflow fluidized bed reactor and a downstream parallel-flow fluidized bed reactor, a duct feeding reducing gas running both into the counterflow and into the parallel-flow fluidized bed reactors.

The conveying duct for fine-particulate iron ore preferably opens into the starting region of the reducing gas duct, i.e. shortly after the connection of the latter to the melter gasifier.

A preferred embodiment is characterized in that the conveying duct for fine-particulate iron ore is comprised of a blow-in nozzle projecting through the wall of the reducing gas duct, said blow-in nozzle including a central tube conducting fine particles and a carrier gas and, at the mouth of the central tube, being provided with at least one nozzle which is connected to a gas duct for feeding a secondary gas, the longitudinal axes of the nozzles enclosing an angle with the longitudinal central axis of the central tube, the angle advantageously ranging between 20° and 60°.

The longitudinal axis of the nozzle is preferably skew to the longitudinal central axis of the central tube, wherein, upon projection of the longitudinal axis of the nozzle perpendicular to a plane laid through the longitudinal central axis of the central tube and the nozzle mouth, an angle ranging between 30° and 60° is formed between the projected longitudinal axis of the nozzle and the longitudinal central axis of the central tube.

Another preferred embodiment is characterized in that the conveying duct for fine-particulate iron ore runs into the reducing gas duct with a lance oriented opposite to the flow prevailing in the reducing gas duct.

BRIEF DESCRIPTION OF THE DRAWINGS

In the following, the invention is explained in greater detail by a drawing, wherein FIG. 1 schematically represents a plant for carrying out the process according to the invention in a first embodiment

DETAILED DESCRIPTION OF THE PREFERRED EMBODIMENTS

Figure 1:
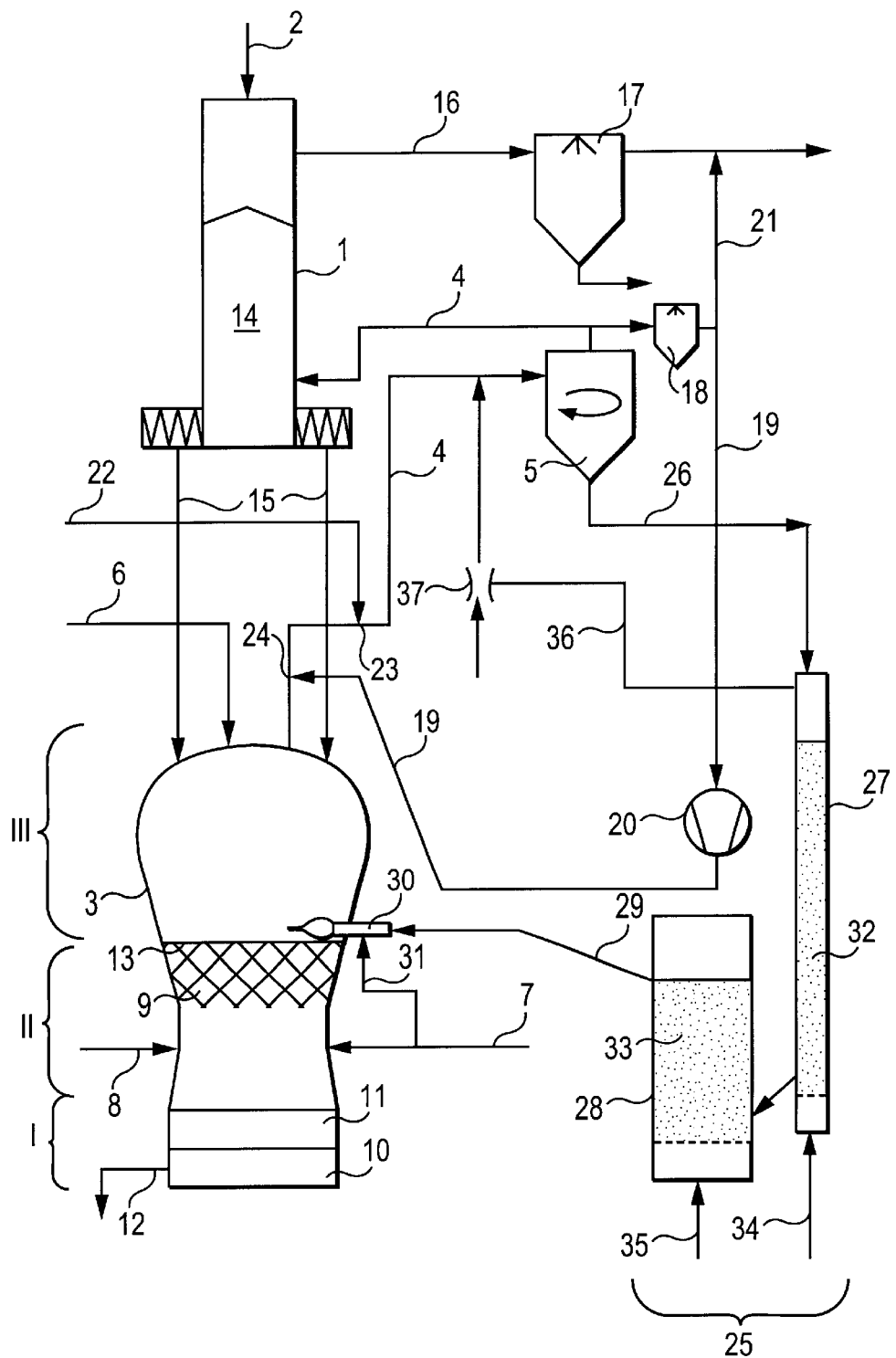

In a shaft furnace forming reduction reactor 1, lumpy iron ore and/or iron ore in the form of pellets is/are charged from the top via conveying means 2 by means of a sluice system not represented, together with additives, if required, thereby forming a fluidized bed.

Fluidized bed means a continuously moving material stream whose moving particles come into contact with a flowing reducing gas. A material stream moving continuously downwards by gravity is preferably used.

instead of shaft furnace 1, also a reduction reactor with a Venturi fluidized bed, a circulating fluidized bed, a fluid bed or a reactor with travelling grate or a rotary kiln can be provided as reduction reactor.

Shaft furnace 1 is connected with melter gasifier 3, in which reducing gas is generated from coal and oxygen-containing gas, which is supplied to shaft furnace 1 via reducing gas duct 4, in which gas cleaning means 5, such as a hot gas cyclone, is provided for dry dust collection.

Melter gasifier 3 comprises supply duct 6 for solid carbon carriers, supply duct 7 for oxygen-containing gases and, if required, supply ducts 8 for carbon carriers which are liquid or gaseous at ambient temperature, such as hydrocarbons, as well as for burnt additives.

In melter gasifier 3, molten pig iron 10 or molten steel prematerial and molten slag 11, which are tapped via tap 12, accumulate in lower section I below meltdown gasifying zone 9.

In section II of melter gasifier 5, which is located above lower section I, bed 13 is formed, preferably as fixed bed and/or as fluidized bed, from the solid carbon carriers. Upper section III, which is provided above central section II, acts as killing space for the reducing gas forming in melter gasifier 3 and for the solid particles entrained by the gas stream formed by the reducing gas.

The iron ore, which is reduced to sponge iron in shaft furnace 1 in direct reduction zone 14, is supplied, for example, by means of discharge screws, together with the additives burnt in direct reduction zone 14 via conveying duct 15, which connects shaft furnace 1 to melter gasifier 3. Export gas discharge duct 16 for the export gas formed from reducing gas in direct reduction zone 14 is connected to the upper part of shaft furnace 1.

The export gas drawn off via export gas discharge duct 16 is first cleaned in scrubber 17 to free it completely from dust particles, if possible, and to lower the steam content to make it available for further use.

Part of the reducing gas formed in melter gasifier 3 is recirculated into supply duct 4 via scrubber 18, which is connected downstream of gas cleaning means 5, and via duct 19 with gas compressor 20 in order to condition the reducing gas leaving melter gasifier 3 in very hot condition prior to entry into gas cleaning means 5, in particular to cool it to a temperature range which is favourable for the direct reduction process in shaft furnace 1. Via equalizing duct 21, excess reducing gas can be added to the export gas leaving shaft furnace 1, if required, in order to keep the system pressure constant.

Fine-particulate iron oxide carriers, such as iron-containing fine ore and ore dust and oxidic iron fine dust, are introduced into the reducing gas stream via conveying duct 22 running into reducing gas duct 4. Seen in the direction of the reducing gas flow, mouth 23 of conveying duct 22 into reducing gas duct 4 is located downstream of mouth 24 of duct 19, which feeds a cooled reducing gas, thus preventing the fine particles from agglomerating due to heat.

While the fine particles are being conveyed from mouth 23 of gas duct 22 up to gas cleaning means 5, the oxidic fine particles already undergo a first prereduction. In gas cleaning means 5, the fine particles are separated and charged into melter gasifier 3 via a dust recirculation means, which is generally marked with 25.

Starting from gas cleaning means 5, dust recirculation means 25 is comprised of conveying duct 26, counterflow fluidized bed reactor 27, into which conveying duct 26 runs, and parallel-flow fluidized bed reactor 28 connected downstream in the direction of flow of the fine particles. From this parallel-flow fluidized bed reactor, conveying duct 29 for fine particles departs, which leads to dust burner 30, which is located at the level of meltdown gasifying zone 9 or thereabove. In addition, oxygen duct 31 runs into this dust burner 30.

Both counterflow fluidized bed reactor 27 and the downstream parallel-flow fluidized bed reactor 28 are fed with reducing gas, which results in the formation and maintenance of counterflow and parallel-flow fluidized beds 32, 33. The reducing gas is fed via branches 34, 35 departing from reducing gas duct 4.

In order to prevent a gas stream flowing from counterflow fluidized bed reactor 27 towards gas cleaning means 5 to the greatest possible extent—which would deteriorate the efficiency of gas cleaning means 5—gas recirculation duct 36 is provided, which departs from counterflow fluidized bed reactor 27 and runs into reducing gas duct 4 via injector 37.

Conveying duct 22 for iron-oxide-containing fine particles runs into reducing gas duct 4 preferably via a means for blowing in these fine particles. This means is provided with blow-in nozzle 38, which projects through wall 39 of reducing gas duct 4 into its interior 40.

Blow-in nozzle 38 is comprised of central tube 41, to which conveying duct 22 is connected and through which the fine particles are blown to its mouth 42 by means of a carrier gas so that a material stream of fine particles is formed at mouth 42.

At mouth 42 of central tube 41, several nozzles 43 are provided enclosing central tube 41 peripherally and connected to gas duct 44 for feeding a secondary gas, via gas conducting tubes 45. These gas conducting tubes 45 are designed as tubes arranged in parallel with longitudinal central axis 46 of central tube 41, which runs into annular space 47, which encloses central tube 41 peripherally and into which gas duct 44 runs.

This annular space 47 is limited by jacket 48 at the outside, which is closed at the end face at mouth 42 and at the opposite end face with end flanges 49, 50. Gas conducting tubes 45 can be turned by means of gastight bearings 51, 52 in relation to end flanges 49, 50.

The ends of gas conducting tubes 45 that are opposite to each other are closed with flanges 53, 54. At outer flanges 54, pivots 55 are mounted, which project outwards by outside end flange 50, limiting annular space 47 at the outside. At pivots 55, drives for turning gas conducting tubes 45 around their longitudinal axes 56 are provided, which are not represented in detail. At inside flanges 53 of gas conducting tubes 45, nozzles 43 are located which enclose an angle L with longitudinal central axis 46 of the central tube.

Gas conducting tubes 45 and, finally, nozzles 43 are supplied with gas via annular space 47 and openings 57 of gas conducting tubes 45.

By turning gas conducting tubes 45 around their longitudinal axes 56, the gas jets flowing from nozzles 43 can be varied as to their position in relation to the material jet in a way that the gas jets can be brought from a position intersecting longitudinal central axis 46 of central tube 41 into a position that is skew in relation to this longitudinal central axis 46. A means for turning gas conducting tubes 45 around their longitudinal axes 56 allows to periodically change the position of the gas jets in relation to the material jet. Angle α enclosed by the gas jets with longitudinal central axis 46 of central tube 41 ranges preferably between 20° and 60° and need not be equally large for all gas jets.

Figure 3:
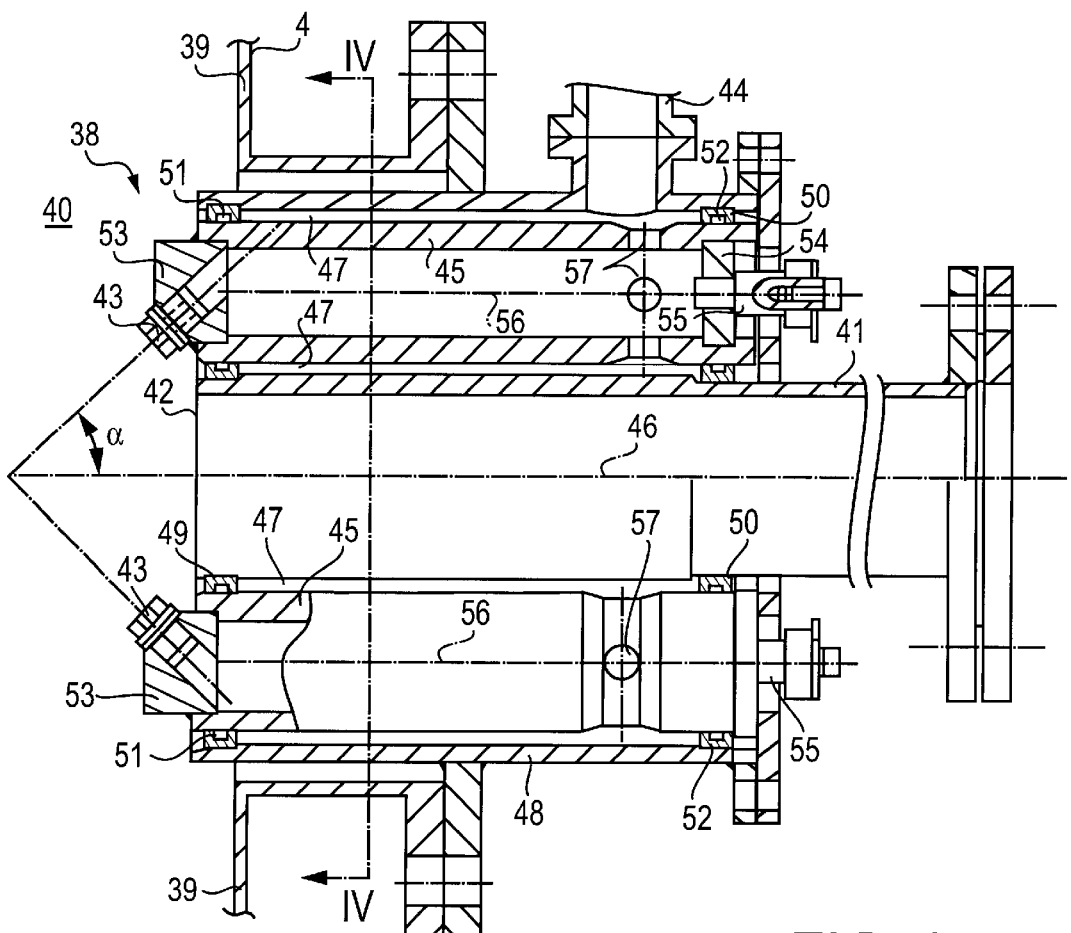
FIGS. 3 and 4 depict a means for introducing the fine-particulate iron oxide carriers, FIG. 3 in longitudinal section and FIG. 4 in cross section according to line IV—IV of FIG. 3.
Figure 4:
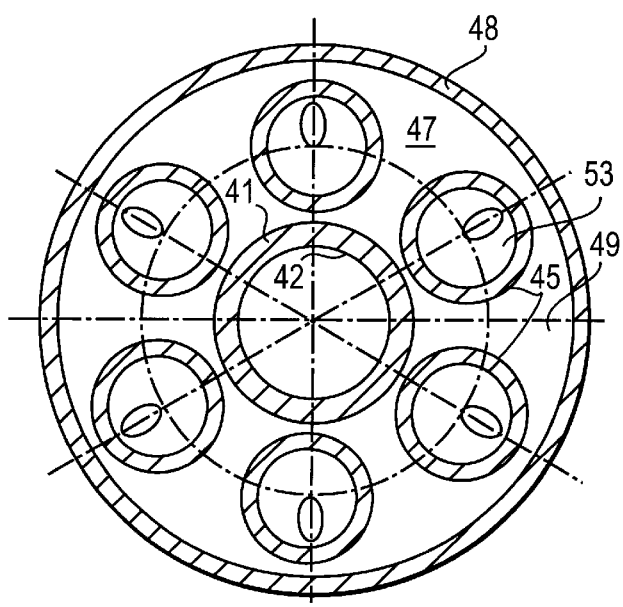

According to the embodiment represented in FIGS. 3 and 4, several nozzles 43 are uniformly distributed around the entire circumference of mouth 42 and central tube 41. However, it may possibly suffice to provide several nozzles 43 only on one half of the circumference of mouth 42 of central tube 41.

The gas jets are preferably formed by inert gas. Inert gas may also be used as carrier gas. Instead of nozzles 43, an annular gap can be provided in end flange 49, through which a fan-shaped gas jet is directed against the material jet.

If the position of the gas jets in relation to the material jet need not be changed, gas conducting tubes 45 are not required; in this case, nozzles 43 can be rigidly inserted in end flange 49.

The iron ore blown into the reducing gas and finely distributed within the reducing gas by means of secondary gas immediately after entering reducing gas duct 4 is reduced, at least partially reduced, within this duct 4.

Additionally to iron ore also fine-grained metallurgical wastes or recyclings in oxidized and/or metallic form as well as possibly additionally carbon-containing materials can be charged via the means according to the invention.

Figure 2:
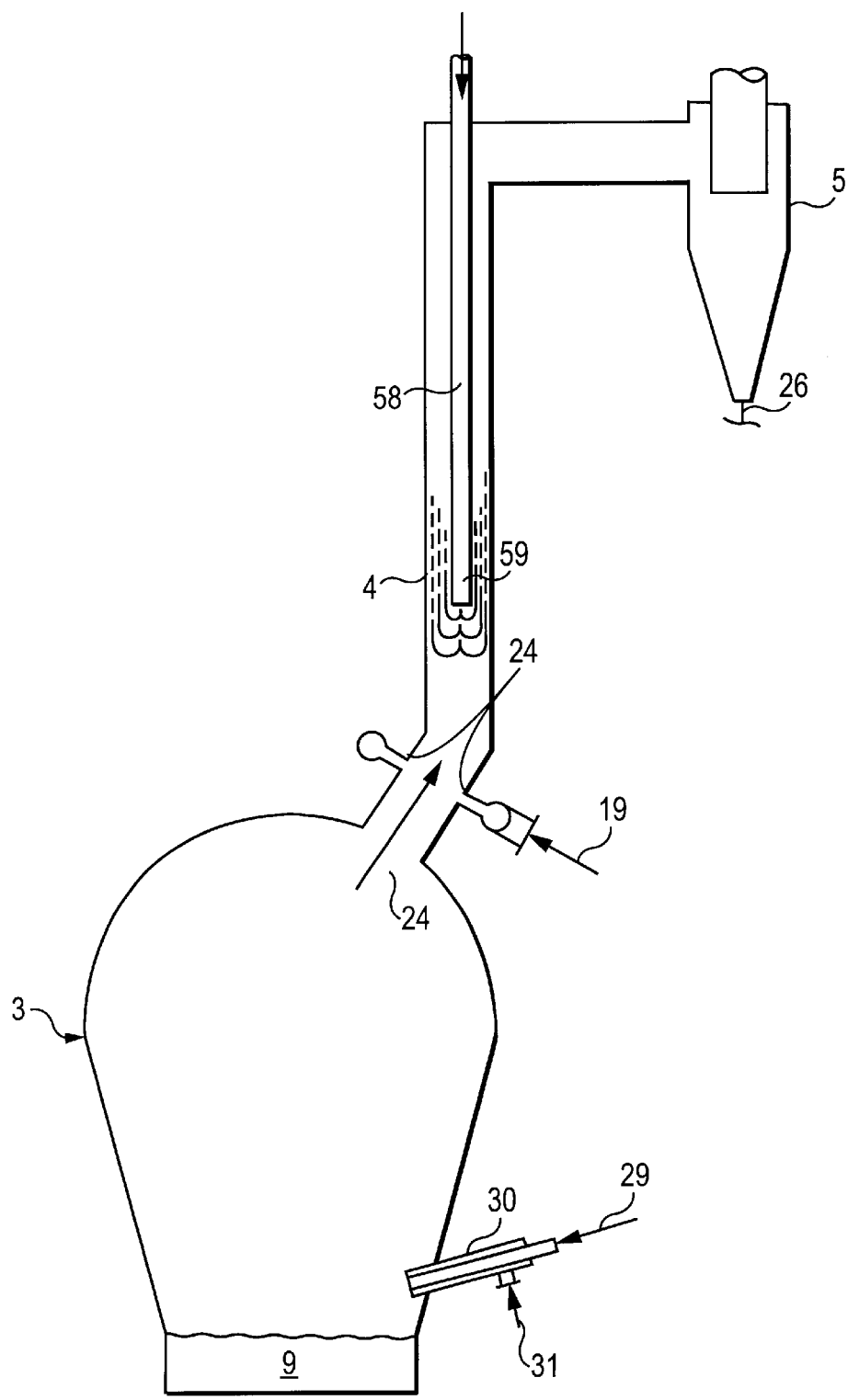
FIG. 2 shows a detail of the plant in a modified embodiment.

In accordance with FIG. 2, oxide-containing fine particles are introduced by means of lance 58, opening into the interior of reducing gas duct 4. In this lance 58, the ore formed from fine particles is conveyed by means of a carrier gas. At end 59 of the lance, the ore exits in a direction opposite to the reducing gas stream and is immediately finely distributed in the latter by eddying, so that a prereduction within reducing gas duct 4 starting immediately after entry is also ensured with this embodiment.

In the following, the invention is explained in greater detail by an embodiment for a plant for producing pig iron with a capacity of 40 t/h. This plant features two dust recirculation means 25 of the type according to the invention. The indicated numerical values are applicable to either of the two dust recirculation means 25. All values in the tables are rounded, which may result in minor deviations from 100%.

4.5 t/h of fine ore are blown in on either of the two dust recirculation means 25. The fine ore shows the following analysis (weight per cent):

TABLE I

| $Fe_2O_3$ (Fe) | 94.3% (66%) |
|---|---|
| $SiO_2$ | 4.2% |
| $Al_2O_3$ | 0.3% |
| Cu | 0.02% |
| Mn | 0.02% |
| Zn | 0.002% |
| TiO | 0.2% |
| CaO | 0.07% |
| S | 0.002% |
| P | 0.02% |
| Moisture | 0.5% |

The grain size distribution is as follows:

TABLE II

| 98% | −1 mm |
|---|---|
| 80% | −0.5 mm |
| 25% | −0.125 mm |

A reducing gas volume of 38,320 $Nm^3/h$ leaves melter gasifier 3. The recirculated cooling gas volume amounts to 3,360 $Nm^3/h$, yielding a total reducing gas volume of 41,680 $Nm^3/h$, which enters gas cleaning means 5. The analysis of the reducing gas upstream of mouth 23 of conveying duct 22 into reducing gas duct 4 is shown in Table III below (in per cent by volume):

TABLE III

| CO | 65.3% |
|---|---|
| $CO_2$ | 2.5% |
| $H_2$ | 27.0% |
| $H_2O$ | 1.5% |
| $CH_4$ | 1.0% |
| $N_2$, Ar | 2.7% |

The temperature of the reducing gas at mouth 23 of conveying duct 22 is 900° C. The reducing gas leaving melter gasifier 3 is dust-laden. The dust content amounts to 130 g/Nm³, and the dust analysis is as follows (weight per cent):

TABLE IV

| Fe | 20% |
|---|---|
| C | 50% |
| $Al_2O_3$, $SiO_2$ | remainder |

For operating the counterflow and parallel-flow fluidized bed reactors 27, 28 forming fluidized bed sluice 25, a reducing gas volume of 2,800 Nm³/h is required, 50 to 20 Nm³/h thereof being added to counterflow fluidized bed reactor 27. The analysis of the reducing gas added here is shown in Table V below (per cent by volume):

TABLE V

| CO | 63.4% |
|---|---|
| $CO_2$ | 2.9% |
| $H_2$ | 26.6% |
| $H_2O$ | 3.0% |
| $CH_4$ | 1.0% |
| $N_2$, Ar | 3.1% |

The reducing gas has a temperature between 750° C. and 800° C.

The process according to the invention ensures a degree of prereduction of 30% in the charged fine ore within reducing gas duct 4. After leaving parallel-flow fluidized bed reactor 28, the iron ore already has a degree of reduction of 65%.

What is claimed is:

1. A process for producing liquid pig iron or steel preproducts from fine-particulate iron-oxide carriers and lumpy iron-containing material in a meltdown gasifying zone of a melter gasifier comprising:

melting the iron-containing material in a bed formed of solid carbon carriers under the supply of carbon-containing material and oxygen-containing gas while simultaneously forming a reducing gas;

introducing fine-particulate iron oxide carriers into a reducing gas stream leaving the melter gasifier to form fine-particulate material;

separating the reducing gas from the fine-particulate material formed thereby;

conveying the separated fine-particulate material to a dust burner via a dust recirculation line and through a fluidized bed sluice formed by the separated fine-particulate material and reducing gas fed thereto;

introducing the separated fine-particulate material into the meltdown gasifying zone from the dust burner; and using the reducing gas for reducing iron-oxide-containing material.

2. A process according to claim 1, wherein the fluidized bed sluice comprises a counterflow fluidized bed zone formed by the separated fine-particulate material and a stream of reducing gas fed in counterflow relative to said material, and a parallel-flow fluidized bed zone formed by the separated fine-particulate material and a stream of reducing gas fed in parallel flow with said material in which zones the fine-particulate material is reduced.

3. A process according to claim 2, wherein the stream of gas in the parallel flow fluidized bed zone is substantially larger than the stream of reducing gas in the counterflow fluidized bed zone.

4. A process according to claim 1, wherein the fine-particulate iron oxide carriers are introduced into the reducing gas stream immediately after the reducing gas stream has left the melter gasifier.

5. A process according to claim 1, wherein the fine-particulate iron oxide carriers are blown into the reducing gas stream.

6. A process according to claim 5, further comprising:

injecting a central material jet formed by the fine-particulate iron oxide carriers and a carrier gas into the reducing gas; and directing at least one gas jet comprised of a secondary gas against the material jet, whereby the gas atomizes the material jet and the fine particulate iron oxide carriers become uniformly distributed within the reducing gas.

7. A process according to claim 6 wherein the gas jet imparts to the material jet a torque about the axis of the material jet and the fine particulate iron oxide carriers leave the material jet due to centrifugal forces, thereby disintegrating the same.

8. A process according to claim 5, wherein the fine-particulate iron oxide carriers are blown into the reducing gas stream in a direction opposite to the flow of the reducing gas stream.

9. A process according to claim 5, wherein the fine-particulate iron oxide carriers are blown into the reducing gas stream upon cooling the reducing gas stream to 800° to 900°.

10. A process according to claim 1, wherein the lumpy iron-containing material includes partially or completely reduced sponge iron.

11. A process according to claim 1, wherein the fine particulate iron oxide carriers includes at least one of iron containing fine ore, ore dust, and oxidic iron fine dust.

12. A plant for carrying out the process according to claim 1, comprising:

a melter gasifier having
        a lower section for collecting molten pig iron or steel prematerial and liquid slag,
        a central section located above the lower section for accommodating a bed of solid carbon carriers,
        an upper section provided as a killing space, and
        a slag and iron melt tap;

a supply duct for supplying carbon-containing material to the melter gasifier;

a reducing gas duct for drawing off the reducing gas produced in the melter gasifier;

a solids separator provided along the reducing gas duct;

a duct for feeding oxygen-containing gas to the melter gasifier;

a reduction vessel for at least partially reducing iron-oxide-containing material, wherein the reduction vessel is connected to the melter gasifier via the reducing gas duct and a duct for conveying the at least partially reduced material from the reduction vessel to the melter gasifier;

a conveying duct for conveying fine-particulate iron oxide carriers into the reducing gas duct; and a dust recirculation stage departing from the solids separator and opening into the melter gasifier through a dust burner, wherein the dust recirculation stage comprises at least one fluidized bed reactor, through which the reducing gas is fed.

13. A plant according to claim 12, wherein the dust recirculation stage is comprised of a counterflow fluidized bed reactor, a consecutively arranged parallel-flow fluidized bed reactor, and a respective duct feeding reducing gas into the counterflow fluidized bed reactor and into the parallel-flow fluidized bed reactor.

14. A plant according to claim 12, wherein the conveying duct for fine-particulate iron oxide carriers opens into the reducing gas duct in a region of the reducing gas duct just after its connection to the melter gasifier.

15. A plant according to claim 12, wherein the conveying duct for fine-particulate iron oxide carriers comprised of a blow-in nozzle projecting through the wall of the reducing gas duct, said blow-in nozzle including a central tube for conducting fine particles and a carrier gas, and at the mouth of the central tube, at least one nozzle connected to a gas duct for feeding a secondary gas, wherein a longitudinal axis of the nozzle forms an angle with a longitudinal central axis of the central tube.

16. A plant according to claim 15, wherein the angle ranges between 20° and 60° C.

17. A plant according to claim 15, wherein the longitudinal axis of the nozzle is oriented in a skew manner relative to the longitudinal central axis of the central tube, wherein, upon projection of the longitudinal axis of the nozzle perpendicular to a plane laid through the longitudinal central axis of the central tube and the nozzle mouth, an angle ranging between 30 and 60° is formed between the projected longitudinal axis of the nozzle and the longitudinal central axis of the central tube.

18. A plant according to claim 12, wherein the conveying duct for fine-particulate iron oxide carriers opens into the reducing gas duct by means of a lance oriented opposite to the flow prevailing in the reducing gas duct.

* * * * *